United States Patent [19]
Piper et al.

[11] 3,869,038
[45] Mar. 4, 1975

[54] ARTICLE CONVEYING APPARATUS

[75] Inventors: Robert J. Piper, Detroit; Frank K. Locke, Hudson, both of Mich.

[73] Assignee: Stearns Manufacturing Co. Inc., Flat Rock, Mich.

[22] Filed: Aug. 9, 1973

[21] Appl. No.: 386,941

[52] U.S. Cl. ................................................ 198/165
[51] Int. Cl. ............................................. B65g 15/14
[58] Field of Search ........... 198/165, 182, 195, 196, 198/197

[56] References Cited
UNITED STATES PATENTS
3,743,079  7/1973  Sicilliano ....................... 198/165 X
FOREIGN PATENTS OR APPLICATIONS
771,579   4/1957  Great Britain ....................... 198/196
1,235,803 3/1967  Germany ............................. 198/195

*Primary Examiner*—James B. Marbert
*Assistant Examiner*—Douglas D. Watts
*Attorney, Agent, or Firm*—Hauke, Gifford, Patalidis and Dumont

[57] ABSTRACT

A conveyor assembly comprising a pair of endless conveyors having adjacent portions and each having a series of resilient, article carrying members mounted on two spaced parallel continuous conveyor chains to envelope an article between opposing resilient carrying members to transport the article from one place to another. Two transversely disposed hinges are provided to connect the front and back lower edges of the resilient carrying members to the chains and two transversely disposed rods are disposed intermediate the hinges. The hinges can be disassembled from one side of the conveyor. The article carrying members have a resilient, flexible inner core covered by a flexible fabric cover which includes a zipper to close an opening therein through which the inner core can be inserted or removed from the cover.

10 Claims, 7 Drawing Figures

PATENTED MAR 4 1975 3,869,038
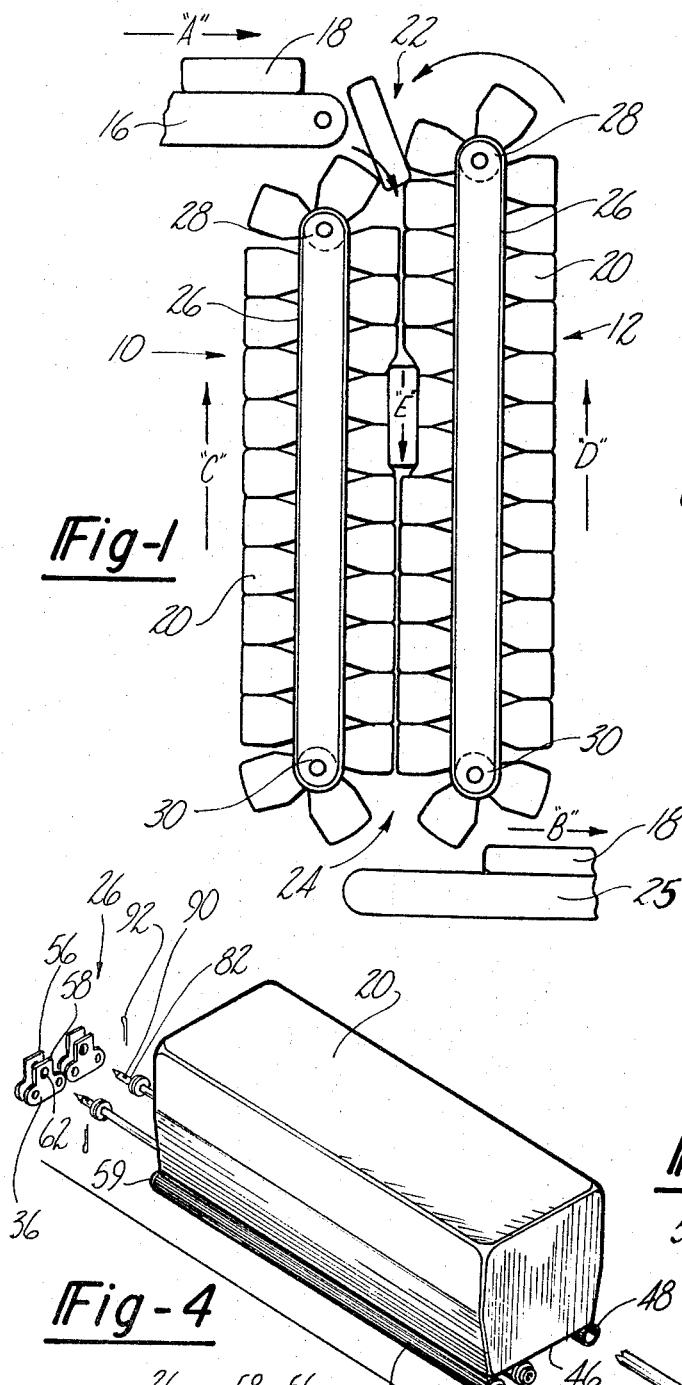
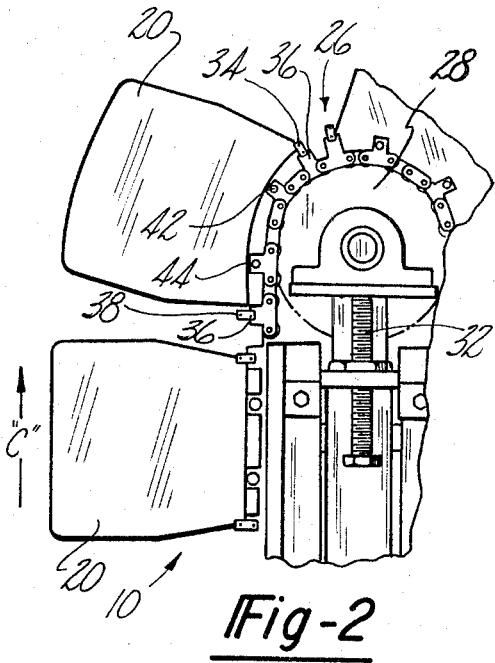
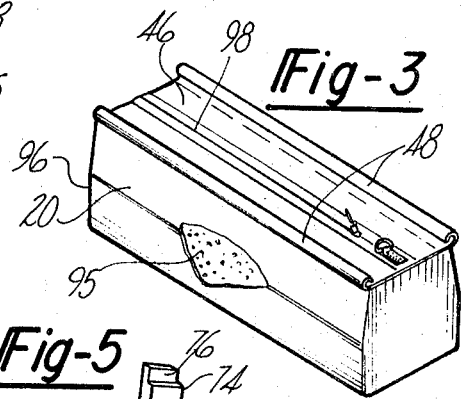
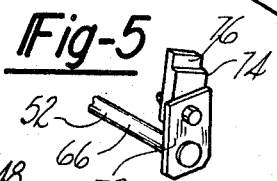
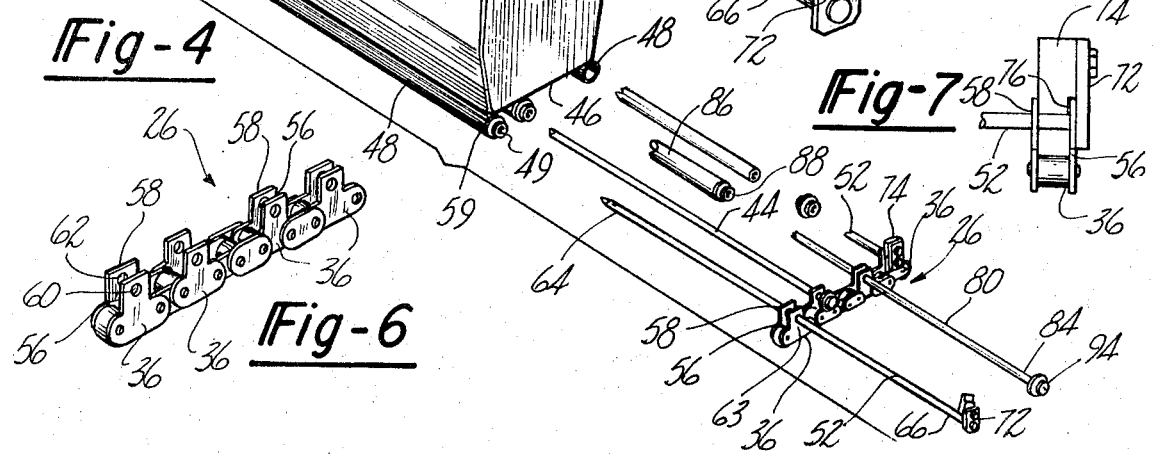

ARTICLE CONVEYING APPARATUS

BACKGROUND OF THE INVENTION

I. Field of the Invention

The present invention relates to conveyors for moving articles from one place to another, and more particularly to a pair of opposed endless conveyor members having resilient article carrying members fastened thereto to carry the articles therebetween.

II. Prior Art

Conveyors provided with flexible, article carrying members attached to or part of an endless conveyor member and adapted to envelope an article to be carried are not new.

In each of the previously known conveyors of this type removal of the flexible, resilient article carrying members has been difficult. This is an important disadvantage because of their nature and use, the pads, as they are called, quickly become worn or damaged and frequent replacement is necessary. Heretofore replacement of the pads required that the conveyor assembly be shut down for long periods of time while the endless chains were removed and the conveyor assembly was completely torn down.

SUMMARY OF THE INVENTION

The present invention relates to improvements in conveyor assemblies employing endless chains carrying a plurality of flexible resilient article engaging members attached thereto, which resilient members envelope the articles, such as baggage, to be conveyed and move the articles from one place to another. The improvement comprises the provision of a pair of hinges, for each of the article engaging members, one of the hinges connecting a front edge of the member to a pair of endless chains and the other hinge connecting a back edge of the member to the pair of endless chains. The hinges have their pivotal axis disposed generally transverse to the direction of travel of the chains.

The invention also provides for at least one support roller for the article engaging members connected to the chains and being disposed between and generally parallel to the first and second hinges associated with each article engaging member.

The article engaging members may be individually removed, as for replacement, by disassembling the first and second hinges without disturbing the chains or the other components of the conveyor mechanism. Further, the first and second hinges may be disassembled from one side of the conveyor mechanism.

The invention also embraces the provision of the article engaging members having a flexible inner core removably contained in a flexible outer cover, the flexible cover having a closable opening through which the core in inserted into and removed from the cover for individual replacement of the core and cover as needed.

BRIEF DESCRIPTION OF THE DRAWINGS

One possible embodiment of the present invention is illustrated in the accompanying drawings, wherein like numerals refer to like parts throughout the several views and in which:

FIG. 1 is a side elevational view of a conveyor assembly of the present invention;

FIG. 2 is an enlarged fragmentary view of the head portion of the assembly shown in FIG. 1;

FIG. 3 is a bottom perspective view of one of the flexible article carrying members of the present invention;

FIG. 4 is a top perspective view of the article carrying member of FIG. 3 and an exploded view of the means by which the article engaging member is mounted in place;

FIG. 5 is a perspective fragmentary view of one of the components of the mounting means of FIG. 4;

FIG. 6 is a perspective fragmentary view of an endless chain utilized in the present invention; and FIG. 7 is a side view of the mounting means illustrated in FIG. 4.

DETAILED DESCRIPTION OF THE PREFERRED EMBODIMENT

FIG. 1 illustrates a conveyor assembly 10 of the present invention as comprising two vertically oriented substantially identical conveyor transfer mechanism 12 and 14 disposed next to each other. A standard horizontal belt conveyor 16 is provided at an upper level to feed articles 18 to a receiving end 22 of the conveyor assembly 10. The articles 18 are moved vertically through the conveyor assembly 10 in a manner which will become more apparent as the description proceeds and the articles 18 are delivered through a lower discharge end 24. Another horizontal standard belt conveyor 25 is provided.

Transfer mechanism 12 and 14 are substantially identical and, therefore, the components of each will be referred to by the same reference numerals. Further, the longitudinal sides of each of the transfer members are identical, therefore, for clarity of description, only one longitudinal side of one of the transfer mechanisms is illustrated in FIGS. 1 and 2, the components of each longitudinal side also being referred to by the same reference numerals.

Each transfer mechanism 12 and 14 includes two parallel spaced apart identical continuous or endless chains 26. Each of the endless chains is trained about a set of head chain sprockets 28 and tail chains sprockets 30. The chain sprockets 28 and 30 are rotatably driven by, for example, an electric motor (not shown) to thereby move the chains 26. A plurality of resilient, flexible article engaging members 20 are individually and removably mounted to the parallel endless chains 26 for travel therewith.

Upon being fed through the receiving end 22, the articles 18 are sandwiched between confronting resilient flexible article engaging members 20 of the conveyor transfer mechanisms 12 and 14, respectively, and are thereby conveyed downwardly from the receiving end 22 to the discharge end 24 of the conveyor assembly 10.

In FIG. 1, arrow A indicates the direction of travel of the belt conveyor 16, arrow B indicates the direction of travel of the belt conveyor 16, arrow C indicates the direction of travel of the members 20 of the conveyor transfer mechanism 12, arrow D indicates the direction of travel of the members 20 of the conveyor transfer mechanism 14, and arrow E indicates the direction of travel of the articles 18 as they are conveyed by the conveyor assembly 10.

While FIG. 2 shows only one of the endless chains 26 disposed along one longitudinal side of a conveyor transfer mechanism 10 it is to be understood that a similar conveyor chain is disposed along the other longitudinal side of the conveyor transfer mechanism 10 and that the conveyor transfer mechanism 12 similarly has a pair of endless chains like the one shown in FIG. 2.

FIG. 2 shows the head portion of the conveyor transfer mechanism 10 with the chain 26 trained about a portion of the periphery of the head sprocket 28. A standard type take-up device 32 is provided to take up the tension in the endless conveyor chain 26 to thereby provide adjustment. These take-up devices are well known in the art and will, therefore, not be further described.

The resilient flexible article engaging members 20 are removably mounted to the parallel endless conveyor chains 26. Each member 20 is mounted to the parallel conveyor chains 26 by a pair of hinges comprising a first hinge, generally denoted at 34, connecting the leading edge of the member 20 to links 36 of the endless chains 26, and a second hinge, generally denoted as 38, connecting the trailing edge of the member 20 to another pair of substantially identical links 36 of the endless chains 26. The pivotal axes of the first and second hinges 34, 38 are disposed laterally with respect to the direction of movement of the endless chains 26. In addition, a first support roller 42 and a second support roller 44 are located between and generally parallel to the first hinge 34 and the second hinge 38, and are mounted at their opposite ends to different ones of the parallel endless chains 26 of the conveyor transfer mechanism.

FIG. 3 illustrates the bottom surface, generally denoted as 46, of a resilient flexible article engaging member 20, i.e., that surface which is located adjacent the endless chain members 26.

With particular reference to FIGS. 4 and 6, the links 36 of the parallel chains 26 have a pair of outwardly extending spaced apart flanges 56, 58 integral with opposite longitudinal sides of the link 36. Each of these flanges 56, 58 has a hole 60, 62, respectively, therethrough, these holes being coaxial. Further, the coaxial holes 60, 62 of a pair of flanges 56, 58 of each of the links 36 comprising one of the chains 26 are also coaxial with the holes 60, 62 of a pair of flanges 56, 58 of different predetermined links 36 of the other parallel endless chain 26 of the conveyor transfer mechanism.

Now referring again to FIGS. 3 and 4, the first and second hinges 34 and 38 are substantially identical and, therefore, the components of the hinges will be referred to by the same reference numerals. While the following description refers to the first hinge 34 for clarity, it holds true with reference to the second hinge 38 also. The hinge 34 is comprised of a hollow elongated tubular member 48 connected to the bottom surface 46 of the article engaging member 20. As can best be seen in FIG. 2, a roller tube 49 having flanged roller bearings 59 at its opposite ends is axially received in the hollow elongated tubular member 48. A mounting rod 52 is axially received through the roller tube 49 and the bearings 59 so that the elongated tubular member 48 can pivot about the longitudinal axis of the mounting rod 52.

One end 64 of mounting rod 52 is received in the holes 60, 62 in flanges 56, 58 of a predetermined link 36 of the endless chains 26 disposed along one longitudinal side of the transfer mechanism, and another end 66 of mounting rod 52 is received in the holes 60, 62 in flanges 56, 58 of a predetermined link 36 of the endless chain 26 disposed along the other parallel longitudinal side of the transfer mechanism so that the mounting rod 52 is transversely disposed and extends between the parallel chain members 26.

The mounting rod 52 has means to connect its end 66 to the flanges 56, 58, thereby preventing axial movement of the rod 52. This connection means is best shown in FIGS. 4, 5, and 7, and comprises an arm 72 connected at a right angle to one of its ends to the end 66 of rod 52. A bracket 74 is pivotally connected near one of its ends to the other end of arm 72 such that it can be pivoted in a plane generally perpendicular to the rod 52. The other end of bracket 74 has a step 76 (FIGS. 5 and 7) which fits between the flanges 56 and 58. When the rod 52 is inserted through the holes 60, 62 in flanges 56, 58 of the links 36 in the two parallel endless chains 26, the arm 72 abuts the outside surface 63 of flange 56. The bracket 74 is pivotal from a disengaged position as shown in FIG. 5 to an engaged position wherein the step 76 is located between the flanges 56 and 58 as shown in FIG. 7. Thus, flange 56 is locked between bracket 74 and arm 72 preventing axial movement of the rod 52, thereby, locking the rod 52 in position transverse to the endless chain 26. Since the rod 52 cannot move transversely, the ends 64 of the rod 52 cannot escape from the holes 60–62 and the article engaging member 20 is thereby locked to the endless chains 26.

Again referring particularly to FIGS. 2 and 4, the first and second support rollers 42, 44 respectively, are substantially identical and, therefore, for the sake of clarity, the following description will be directed to one of the first support rollers 42, it being understood that the description applies equally to the second support rollers 44.

The support roller 42 includes a rod 80 having ends 82 and 84. The end 82 is contained in the holes 60, 62 in flanges 56, 58 of a link 36 of the endless chains 26 disposed along one longitudinal side of the transfer mechanism, and the end 84 is contained in the holes 60, 62 in flanges 56, 58 of link 36 of the endless chain 26 disposed along the other parallel longitudinal side of the transfer mechanism so that the rod 80 is laterally situated with respect to the two parallel chains 26. A hollow support roller tube 86 having flanged roller bearings 88 at its opposite ends is axially slidable over the rod 80 and is rotatably mounted thereon. The outer peripheral surface of the support roller tube 86 contacts the bottom surface 46 of the article engaging member 20.

To prevent the rod 80 from axial movement which would cause it to disengage from the holes 60, 62 in flanges 56, 58 of links 36 of the two parallel endless chains 26, end 82 has a hole 90 therethrough perpendicular to the axis of the rod 80 to receive a cotter key 92, and the end 84 has an enlarged head 94 which is larger than the holes 60, 62. Thus, when the rod 80 is installed in position, the cotter key 92 and head 94 coact to lock the rod 80 in position transverse to the two parallel endless chains 26.

The article engaging member 20 comprises an inner core 95 (FIG. 3) preferably constructed of a resilient flexible low density polyurethane foam removably encased in an outer cover 96 of a flexible nylon neoprene. The outer cover 96 includes an opening closable by a zipper 98, to allow the inner core 95 to be inserted in and removed from the cover 96. This feature allows selective replacement of the cover 96, or the inner core 95 as required, thus, obviating the necessitiy of replacing the entire article engaging member 20 if only the outer cover 96 or only the inner core 95 becomes worn.

The construction of the means to connect the ends 66 of the mounting rods 52 and 54 to the endless chains 26 allows the mounting rods 52 and 54, and thus, the article engaging members 20, to be installed and removed from one longitudinal side of the conveyor transfer mechanism. This is an important feature particularly in those applications wherein one longitudinal side of the conveyor mechanism is inaccessible as when the conveyor mechanism abuts a wall.

As the flexible resilient article carrying members 20 travel around the head and tail sprockets 28, 30, the bottom surface 46 must be arcuately deformed to conform generally to the radius of the sprockets. The first and second hinges 34, 38 and the first and second support rollers 42, 44 coact to accomplish this deformation. The first and second hinges being connected to the chains 26 and the article engaging members 20 force the front and back edges, respectively, of the member 20 to follow the chains 26, while the two support rollers 42, 44 force the bottom surface 46 of the article engaging member 20 away from the chains, thus, warping the bottom surface 46 as it travels around the sprockets.

The foregoing detailed description is given primarily for clarity of understanding and no unnecessary limitations should be understood therefrom, for modifications will be obvious to those skilled in the art and may be made without departing from the spirit of the invention or the scope of the appended claims.

I claim:

1. In combination with an endless conveying apparatus of the type wherein a plurality of resilient flexible article engaging members engage an article to be conveyed, and wherein the resilient flexible article engaging members are connected to two parallel spaced continuous chain members disposed along opposite longitudinal sides of the apparatus and trained about head chain sprockets and tail chains sprockets, the improvement which comprises:
    a pair of hinges comprising a first hinge and a second hinge connecting each article engaging member to the continuous chain members;
    said first hinge connecting a leading edge of said article engaging member to each of the continuous chain members, the pivotal axis of said first hinge being generally transverse to the direction of movement of said continuous chain members,
    said second hinge connecting a trailing edge of said article engaging members to each of the continuous chain members, the pivotal axis of said second hinge being generally transverse to the continuous chain members, and
    said first hinge and said second hinge each comprising an elongated tubular member connected to said article engaging member, a mounting rod slidably receivable in said elongated tubular member thereby being mounted on said mounting rod for rotational movement about the longitudinal axis of said mounting rod;
    means to removably mount opposite ends of said mounting rod to different ones of the two parallel continuous chain members, and
    means to connect one end of said mounting rod to one of the continuous chain members to prevent axial movement of said mounting rod.

2. The combination as defined in claim 1, including:
    at least one support roller disposed between and generally parallel to said pair of said first and second hinges associated with said article engaging members.

3. The combination as defined in claim 2, wherein two of said support rollers are disposed in parallel relationship between said first hinge and said second hinge.

4. The combination as defined in claim 1, wherein said means to removably mount the opposite ends of said mounting rod to a different one of the parallel continuous chain members comprises:
    pairs of outwardly projecting parallel flanges connected to opposite longitudinal sides of predetermined links of the two continuous chain members, each pair of flanges connected to the links of one of the continuous chain members being aligned with a different predetermined pair of flanges connected to the links of the other continuous chain member;
    each of said flanges of each pair of flanges have a hole therethrough, said holes in a pair of flanges being coaxial with each other and coaxial with said holes in said flanges of the predetermined pair of flanges with which they are aligned; and
    said mounting rod being axially received through said holes in said aligned pairs of flanges such that said mounting rod is transversely disposed to the continuous chain members.

5. The combination as defined in claim 4, wherein said means to connected one end of said mounting rod to one of the continuous chain members to prevent axial movement of said mounting rod comprises:
    an arm having two ends connected near one end to one end of said mounting rod and extending at a right angle thereto; and
    a bracket having two ends pivotally mounted at one end to the other end of said arm, the other end of said bracket being receivable between said flanges to lock one of said flanges between said bracket and said arm to selectively prevent axial movement of said mounting rod from said holes in said pairs of flanges.

6. In combination with an endless conveying apparatus of the type wherein a plurality of resilient flexible article engaging members engage an article to be conveyed, and wherein the resilient flexible article engaging members are connected to two parallel spaced continuous chain members disposed along opposite longitudinal sides of the apparatus and trained about head chain sprockets and tail chains sprockets, the improvement which comprises:
    a pair of hinges comprising a first hinge and a second hinge connecting each article engaging member to the continuous chain members;
    said first hinge connecting a leading edge of said article engaging member to each of the continuous chain members, the pivotal axis of said first hinge being generally transverse to the direction of movement of said continuous chain members,
    said second hinge connecting a trailing edge of said article engaging members to each of the continuous chain members, the pivotal axis of said second hinge being generally transverse to the continuous chain members,
    at least one support roller disposed between and generally parallel to said pair of said first and second hinges associated with said article engaging members, said support roller comprising a rod transversely disposed to the two parallel continuous chain members, means to mount opposite ends of said rod to different ones of the two parallel chain members, for an elongated hollow support roller tube mounted for rotational movement on said rod, such that the outer peripheral surface of said hollow support tube is in contact with the surface of said resilient article carrying member which is adjacent the continuous chain members.

7. The combination as defined in claim 8, wherein said means to mount opposite ends of said rod to different ones of the two parallel chain members comprises:

pairs of outwardly projecting parallel flanges connected to opposite longitudinal sides of predetermined links of the two continuous chain members, each pair of flanges connected to the links of one of the continuous chain members is aligned with a predetermined pair of flanges connected to the links of the other continuous chain member;

each of said flanges of each pair of flanges have a hole therethrough, said holes in a pair of flanges being coaxial with each other and coaxial with said holes in said flanges of the predetermined pair of flanges with which they are aligned; and said rod being axially received through said holes in said aligned pairs of flanges such that said rod is transversely disposed to the continuous chain members.

8. The combination as defined in claim 7, wherein said rod comprises:

an enlarged heat at one end of said rod to prevent said rod from axially passing entirely through said holes in said flanges;

means defining a hole at the other end of said rod generally transverse to the longitudinal axis of said rod; and a cotter key receivable in said transversely disposed hole at the other end of said rod, said enlarged head and said cotter key coacting to retain said rod in said holes in said flanges.

9. In combination with an endless conveying apparatus of the type wherein a plurality of resilient flexible article engaging members engage an article to be conveyed, and wherein the resilient flexible article engaging members are connected to two parallel spaced continuous chain members disposed along opposite longitudinal sides of the apparatus and trained about head chain sprockets and tail chains sprockets, the improvement which comprises:

a pair of hinges comprising a first hinge and a second hinge connecting each article engaging member to the continuous chain members;

said first hinge connecting a leading edge of said article engaging member to each of the continuous chain members, the pivotal axis of said first hinge being generally transverse to the direction of movement of said continuous chain members, said second hinge connecting a trailing edge of said article engaging members to each of the continuous chain members, the pivotal axis of said second hinge being generally transverse to the continuous chain members, and at least two support rollers disposed between and generally parallel to said hinges.

10. In combination with an endless conveying apparatus of the type wherein a plurality of resilient flexible article engaging members engage an article to be conveyed, and wherein the resilient flexible article engaging members are connected to two parallel spaced continuous chain members disposed along opposite longitudinal sides of the apparatus and trained about head chain sprockets and tail chains sprockets, the improvement which comprises:

a pair of hinges comprising a first hinge and a second hinge connecting each article engaging member to the continuous chain members;

said first hinge connecting a leading edge of said article engaging member to each of the continuous chain members, the pivotal axis of said first hinge being generally transverse to the direction of movement of said continuous chain members, said second hinge connecting a trailing edge of said article engaging members to each of the continuous chain members, the pivotal axis of said second hinge being generally transverse to the continuous chain members, each of said resilient flexible article carrying members comprising an inner core of a resilient flexible material, an outer cover of flexible material to encase said inner core and having an opening in one surface through which said inner core is inserted into and removed from said outer covering and closing means to close said opening in said outer cover, said inner core being fabricated of a low density polyurethane foam, said outer core being fabricated of a flexible nylon reinforced neoprene, and said closing means being a zipper attached to the outer cover.

* * * * *

UNITED STATES PATENT OFFICE
CERTIFICATE OF CORRECTION

PATENT NO. : 3,869,038
DATED : March 4, 1975
INVENTOR(S) : Robert J. Piper and Frank K. Locke It is certified that error appears in the above-identified patent and that said Letters Patent are hereby corrected as shown below:

Col. 2, line 27, after "provided" insert --to remove the discharged article 18--

Col. 2, line 57, delete "16" and insert --25--

Col. 2, line 59, delete "12" and insert --14--

Col. 2, line 61, delete "14" and insert --12--

Col. 3, line 53, delete "2" and insert --4--

Signed and sealed this 6th day of May 1975.

(SEAL)
Attest:

RUTH C. MASON
Attesting Officer

C. MARSHALL DANN
Commissioner of Patents
and Trademarks